United States Patent
Laue et al.

(10) Patent No.: US 10,352,324 B2
(45) Date of Patent: Jul. 16, 2019

(54) DETERMINING THE DELIVERY RATE OF A PUMP

(71) Applicant: KSB Aktiengesellschaft, Frankenthal (DE)

(72) Inventors: Stefan Laue, Woellstein (DE); Jochen Schaab, Worms-Pfeddersheim (DE)

(73) Assignee: KSB Aktiengesellschaft, Frankenthal (DE)

( * ) Notice: Subject to any disclaimer, the term of this patent is extended or adjusted under 35 U.S.C. 154(b) by 0 days.

(21) Appl. No.: 15/327,251

(22) PCT Filed: Jul. 17, 2015

(86) PCT No.: PCT/EP2015/066417
§ 371 (c)(1),
(2) Date: Jan. 18, 2017

(87) PCT Pub. No.: WO2016/009043
PCT Pub. Date: Jan. 21, 2016

(65) Prior Publication Data
US 2017/0198699 A1     Jul. 13, 2017

(30) Foreign Application Priority Data
Jul. 18, 2014    (DE) .................. 10 2014 214 033

(51) Int. Cl.
*F04D 15/00*      (2006.01)
*G01F 5/00*       (2006.01)

(52) U.S. Cl.
CPC ......... *F04D 15/0088* (2013.01); *G01F 5/005* (2013.01)

(58) Field of Classification Search
CPC .......................... F04D 15/0088; G01F 5/005
(Continued)

(56) References Cited

U.S. PATENT DOCUMENTS

| 2007/0078610 A1* | 4/2007 | Adams ............ G01N 1/10 702/28 |
| 2012/0111114 A1 | 5/2012 | Emde et al. |

(Continued)

FOREIGN PATENT DOCUMENTS

| DE | 43 09 380 A1 | 9/1994 |
| DE | 198 58 946 A1 | 6/2000 |

(Continued)

OTHER PUBLICATIONS

D. Hellmann, Kreiselpumpenlexikon, KSB, 4th edition, 2009 ISBN 978-3-00-029711-3, including partial English translation (four (4) pages).

(Continued)

*Primary Examiner* — Ricky Ngon
(74) *Attorney, Agent, or Firm* — Crowell & Moring LLP

(57) ABSTRACT

The invention relates to a method for determining the delivery rate of a pump. In this context, a value of the delivery level and a value of the power of the pump are determined. A probability density function is calculated for the delivery level and the power. A first probability density function of the delivery rate is calculated on the basis of a delivery level-delivery rate relationship and the probability density function of the delivery level. A second probability density function of the delivery rate is determined on the basis of a power-delivery rate relationship and the probability density function of the power. A combined probability density function of the delivery rate is determined on the basis of the first and second probability density functions. The delivery rate is determined on the basis of the combined probability density function.

14 Claims, 2 Drawing Sheets

(58) Field of Classification Search
USPC .......................................................... 702/45
See application file for complete search history.

(56) References Cited

U.S. PATENT DOCUMENTS

| | | | |
|---|---|---|---|
| 2014/0180658 A1* | 6/2014 | Rossi | ...................... E21B 49/00 703/10 |
| 2015/0211906 A1 | 7/2015 | Skovmose Kallesoe | |

FOREIGN PATENT DOCUMENTS

| | | |
|---|---|---|
| DE | 10 2009 022 107 A1 | 11/2010 |
| DE | 10 2008 027 039 B4 | 4/2011 |
| DE | 10 2006 049 440 B4 | 8/2014 |
| EP | 2 696 175 A1 | 2/2014 |
| JP | 2004-108177 A | 4/2004 |
| JP | 2006-307682 A | 11/2006 |
| WO | WO 2005/064167 A1 | 7/2005 |

OTHER PUBLICATIONS

International Preliminary Report on Patentability (PCT/IB/338 & PCT/IB/373) issued in PCT Application No. PCT/EP/2015/066417 dated Feb. 2, 2017, including English translation of document C2 (German-language Written Opinion (PCT/ISA/2317)) previously filed on Jan. 18, 2017 (nine (9) pages).
International Search Report (PCT/ISA/210) issued in PCT Application No. PCT/EP2015/066417 dated Oct. 8, 2015 with English-language translation (six (6) pages).
German-language Written Opinion (PCT/ISA/237) issued in PCT Application No. PCT/EP2015/066417 dated Oct. 8, 2015 (six (6) pages).
German Search Report issued in counterpart German Application No. 10 2014 214 033.1 dated Aug. 28, 2014 with partial English-language translation (twelve (12) pages).
German-language Office Action issued in counterpart German Application No. 10 2014 214 033.1 dated Jan. 8, 2015 (four (4) pages).

* cited by examiner

DETERMINING THE DELIVERY RATE OF A PUMP

CROSS REFERENCE TO RELATED APPLICATIONS

This application is a National Stage of PCT International Application No. PCT/EP2015/066417, filed Jul. 17, 2015, which claims priority under 35 U.S.C. § 119 from German Patent Application No. 10 2014 214 033.1, filed Jul. 18, 2014, the entire disclosures of which are herein expressly incorporated by reference.

BACKGROUND AND SUMMARY OF THE INVENTION

The invention relates to a method and arrangement for determining the delivery flow of a pump.

The delivery of a pump is an important operating variable. It is possible to measure the delivery flow directly. Here, use is often made of e.g. magnetic inductive flow meters. These flow meters are often very costly and require additional technical outlay.

A further option for determining the delivery flow consists of indirect methods. Here, use is made of delivery head-delivery flow relationships of the pump, which are also known as H(Q) characteristics. In these delivery head-delivery flow relationships, the delivery head H is plotted against the delivery flow Q.

Further characteristics which are used for determining the delivery indirectly are the power-delivery flow relationships of the pump, which are also referred to as P(Q) characteristics.

The manufacturer ascertains such characteristics, particularly in the case of centrifugal pumps. The characteristic form of the characteristic depends on the pump design, such as impeller, pump casing and rotational speed.

When determining the delivery indirectly by way of H(Q) characteristics and/or P(Q) characteristics, said determination is difficult if the characteristics have a very flat profile or initially increase and then drop off again. In the case of flat characteristics, the ascertained delivery flow is afflicted with a large error since very small deviations in the delivery head or power already lead to very large changes in the ascertained delivery flow.

By way of example, if the delivery should be determined from the pressure difference between pressure side and suction side of the pump by way of an H(Q) characteristic, the latter must be unique. Here, exactly one Q value must be assignable to each H value. This condition is often not satisfied in practice. The H(Q) characteristics are either too flat or initially have a rise and then drop again, and so two delivery flow values are assignable to each H value. The problem also exists if the delivery is intended to be determined by the measured power uptake from the P(Q) characteristic. The curves of such P(Q) characteristics are also often flat and non-unique.

International patent document no. WO 2005/064167 A1 describes a method for an internal amount measurement of a centrifuge pump using pressure recorders. The pressure recorders capture the difference pressure generated by the centrifuge pump. The delivery Q is ascertained from the difference pressure by means of a unit. Here, use is made of both the delivery head and the power.

German patent document no. DE 10 2009 022 107 A1 describes a method for determining the operating point of a centrifuge pump. Here, operating-point-dependent measurement variables are captured by sensors and evaluated during the operation. The operation is determined from mechanical measurement variables. A frequency analysis is used to ascertain a frequency which is linearly proportional to the rotational sound of the pump. The rotational speed is ascertained from the frequency, wherein the operating point is determined from the slip-dependent rotational speed/torque dependence of the asynchronous motor.

It is an object of the invention to specify a method for determining the delivery flow, said method being reliable and connected with as little instrumentation outlay as possible. The method should supply reliable values for the delivery flow, even the case of pumps with flat characteristics. Error sources should be minimized in the process.

According to the invention, this object is achieved by virtue of initially ascertaining the values for the delivery head, more specifically for the so-called reduced delivery head, and for the power of the pump. The reduced delivery head is understood to mean the delivery head reduced by the speed-dependent component—which is initially still unknown on account of the yet to be determined delivery. The reduced delivery head is referred to as delivery head below for reasons of simplicity. A probability density function is then calculated for each of delivery head and power by way of a functional relationship. A first probability density function for the delivery flow is ascertained from a delivery head-delivery flow relationship and from the probability density function for the delivery head. A second probability density function for the delivery flow is ascertained from a power-delivery flow relationship and the probability density function for the power. A combined probability density function is ascertained in a next step from the first probability density function and the second probability density function for the delivery flow. The delivery flow is determined from this combined probability density function.

According to the invention, the data from the delivery head-delivery flow relationship are fused with data from the power-delivery flow relationship in such a way that errors in determining the delivery flow are minimized in a targeted manner. In contrast to conventional methods, it is not the case that a first value for the delivery flow is initially developed from an H(Q) characteristic, followed by a second value for the delivery flow, which is completely independent thereof, being developed from a P(Q) characteristic; instead, the data is fused by way of probability density functions in this sensor data fusion according to the invention.

The method according to the invention supplies particularly accurate and stable values for the delivery flow. Here, decisive advantage consists of an ideal weighting of the characteristics depending on the quality thereof. In the case of characteristic lines extending in a flat manner, a small deviation in the delivery head or in the power leads to large errors in the delivery flow. By applying the probability density functions, the characteristic with a flatter curve in the vicinity of the current operating point is automatically weighted less strongly in the method according to the invention than the characteristic with the steeper curve. The steeper the curve in the vicinity of the current operating point, the stronger the weighting. This dispenses with a separate treatment of non-monotonic, ambiguous characteristics. The ambiguities in the characteristics are automatically eliminated.

In order to carry out the method, use is made of an arrangement which comprises sensors which determine the pressure difference between suction side and pressure side of the pump. Furthermore, use is preferably made here of a machine for determining the effective power and actuation frequency of the motor of the pump. Preferably, this is a frequency converter which supplies these data during operation.

The arrangement comprises at least one unit which captures these measurement data. This is an electronic evaluation unit. The unit comprises a data memory, in which delivery head-delivery flow relationships and power-delivery flow relationships of the pump are stored. The unit has appropriate signal inputs.

Preferably, the probability density function for the delivery head or for the power is calculated by way of functions which have a pronounced maximum. By way of example, use can be made of a triangle function. Here, a normal distribution density function, referred to as a Gaussian function below, was found to be particularly advantageous as a probability density function for the delivery head and for the power.

According to the invention, the probability density function for the delivery head is applied to the delivery head-delivery flow relationship: each delivery flow value is assigned the probability density of the associated delivery head by means of the H(Q) characteristic. A first probability density function for the delivery flow emerges from subsequent normalization, carried out in such a way that the integral over the probability density function is 1.

In a manner analogous to the preceding step, the probability density function for the power is applied to a power-delivery flow relationship in a further step: each discrete delivery flow value is assigned the probability density of the associated power by way of the P(Q) characteristic. A second probability density function for the delivery flow emerges by the subsequent normalization, which is carried out in such a way that the integral over the probability densities is 1.

In a particularly expedient variant of the method, the combined probability density function of the delivery flow is ascertained by multiplying the first probability density function by the second probability density function of the delivery flow and by a subsequent normalization. In a particularly expedient variant of the method, the delivery flow is ascertained as expected value of this probability density function. Alternatively, the sought-after delivery flow may also be determined as the delivery flow associated with the maximum value of this function.

Errors as a consequence of measurement uncertainties are minimized by the multiplicative link of the two probability density functions for the delivery flow.

In one variant of the invention, the power and the rotational speed are ascertained from the motor actuation frequency and the effective power by an algorithm.

In one variant of the invention, the H(Q) characteristics and/or P(Q) characteristics are interpolated and/or extrapolated. To this end, a certain number of nodes are predetermined. By way of example, a linear interpolation may be carried out between the nodes. In order to keep the error as low as possible, a number of nodes which is as large as possible is used.

Alternatively, the characteristics may also be stored as a function, for example in the form of a polynomial.

According to one configuration of the invention, the power-delivery flow relationship and an ascertained value of the power of the known delivery flow are brought into correspondence by an offset correction.

It was found that particularly accurate results for the delivery flow are ascertained in the method according to the invention if the P(Q) characteristic experiences a rotational speed-dependent offset correction. To this end, the power determined for a specific delivery flow Q, preferably Q=0, is compared to the value of the P(Q) characteristic. The deviation is then adapted in the style of a single-point calibration.

Instead of the described conversion of the delivery head and shaft power to the rated rotational speed, there may also be a conversion of the delivery head and the shaft power to a different specific rotational speed. Alternatively, instead of the conversion of the delivery head and the shaft power to a predetermined rotational speed, there may be a conversion of the characteristics, i.e. of the delivery flow-delivery head relationship of the pump, of the power-delivery flow relationship of the pump and the probability density functions for the delivery head and the shaft power, to the current rotational speed of the pump in accordance with the known affinity laws.

Other objects, advantages and novel features of the present invention will become apparent from the following detailed description of one or more preferred embodiments when considered in conjunction with the accompanying drawings.

DETAILED DESCRIPTION

Figure 1:
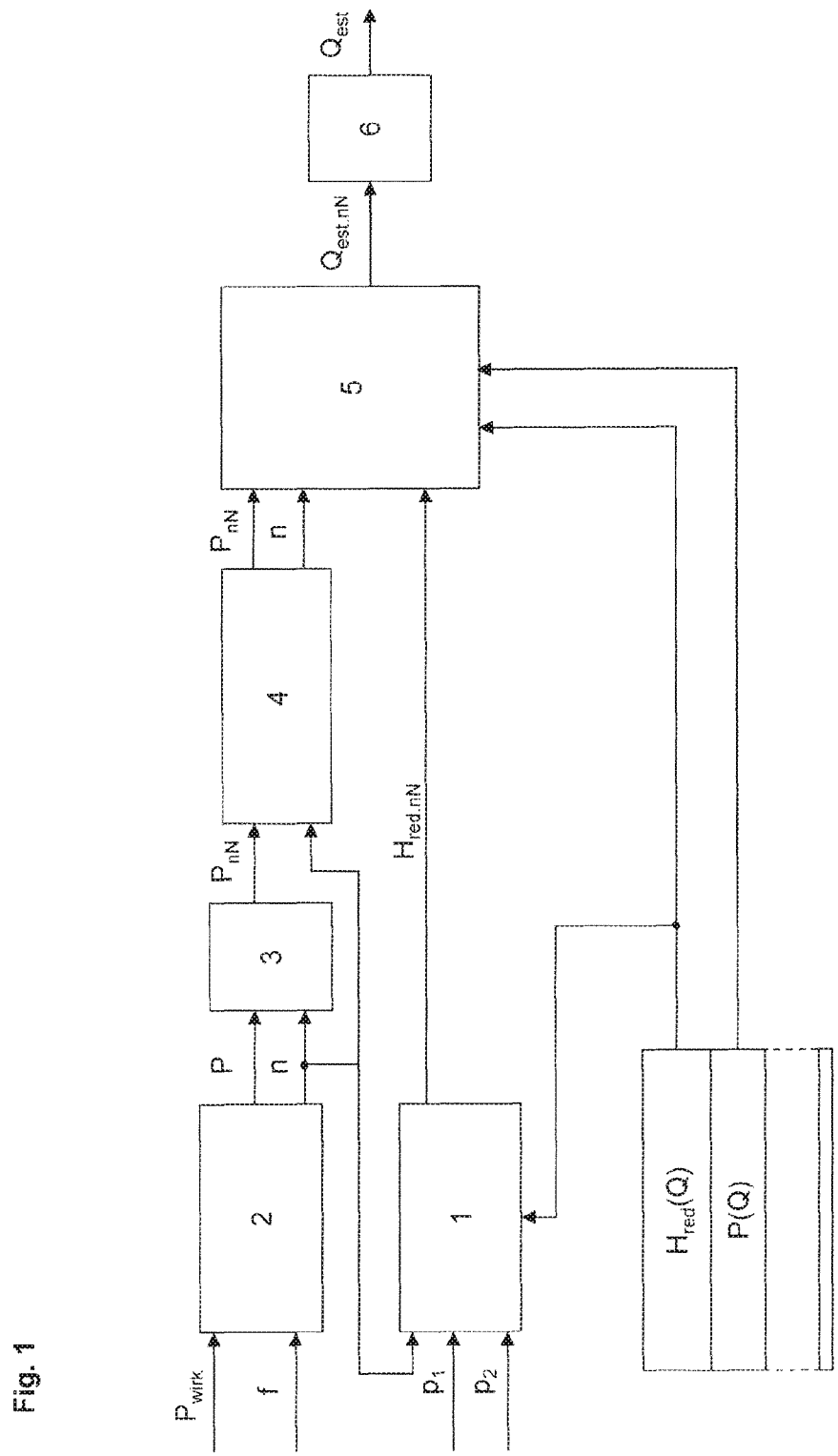
FIG. 1 shows a schematic illustration of the processing of individual parameters in accordance with an embodiment of the present invention.

The sensors, which are not depicted in FIG. 1, ascertain a pressure $p_2$ on the pressure side, in particular in the pressure connector, of a centrifugal pump and a pressure $p_1$ on the suction side, in particular in the suction connector, of the centrifugal pump. A reduced delivery head $H_{red}$ is calculated from the pressures $p_1$ and $p_2$ in a step 1.

The delivery head H calculation is known to a person skilled in the art. In this application, a reduced delivery head $H_{red}$ is understood to mean a delivery head in which the velocity term $(v_2^2-v_1^2)/2g$ (where $v_2$: pressure-side speed, $v_1$: suction-side speed, g: gravitational acceleration) is omitted. When measuring the differential pressure $\Delta p=p_2-p_1$, the measurement positions are configured in such a way that the pressure losses between the measurement positions are negligible. In the exemplary embodiment, a liquid with a largely constant density is delivered.

Therefore, the reduced delivery head $H_{red}$ is available for the current rotational speed of the pump. Since the characteristics of the pump generally apply to the rated rotational speed, the reduced delivery head $H_{red}$ is converted to the rated rotational speed, and so $H_{red,n_N}$ emerges. This calculation is likewise known to a person skilled in the art [Kreiselpumpenlexikon, KSB, $4^{th}$ edition, 2009 ISBN 978-3-00-029711-3].

In the exemplary embodiment, an actuation frequency f and an effective power $P_{wirk}$ of the motor are ascertained by a frequency converter. In a step 2, the shaft power P and the rotational speed n are ascertained from the actuation frequency f and the effective power $P_{wirk}$ by a motor model.

Alternatively, the shaft power may also be ascertained directly by a measuring device, for example a torque measuring hub.

In a step 3, the shaft power $P_{nN}$ at the rated rotational speed is calculated from the current shaft power P and the rotational speed n since the P(Q) characteristic of the pump is generally specified at the rated rotational speed. The conversion of the shaft power to the rated rotational speed is known to a person skilled in the art [Kreiselpumpenlexikon, KSB, $4^{th}$ edition, 2009, ISBN 978-3-00-029711-3].

In a step 4, an offset correction of the P(Q) characteristic is carried out. To this end, the power $P_{n.N.}$ determined for a delivery flow of Q=0 is compared to the value in the P(Q) characteristic created by the producer. The deviation is then removed in the style of a one-point calibration.

In a step 5, the data fusion according to the invention takes place. This step is described in detail in FIGS. 2a, 2b and 2c. The delivery flow for the rated rotational speed $Q_{est.nN}$ determined therefrom is then converted into the delivery flow $Q_{est}$ of the pump in a step 6. The conversion of the delivery flow from the rated rotational speed to the current rotational speed is known to a person skilled in the art [Kreiselpumpenlexikon, KSB, $4^{th}$ edition, 2009 ISBN 978-3-00-029711-3].

The calculations may be carried out in one or more electronic evaluation units. In the exemplary embodiment, the calculation of the mechanical power from the actuation frequency of the motor and the effective power is carried out in a first unit, which is assigned to a frequency converter. The data are then transferred to a second unit in which the pump characteristics are stored. The second unit carries out the data fusion according to the invention for determining the delivery flow.

The delivery head-delivery flow relationships or power-delivery flow relationships may be stored as nodes, with the unit carrying out an interpolation and/or extrapolation. Alternatively, the delivery head-delivery flow relationships or power-delivery flow relationships may also be stored as a function, for example in the form of a polynomial.

Figure 2A:
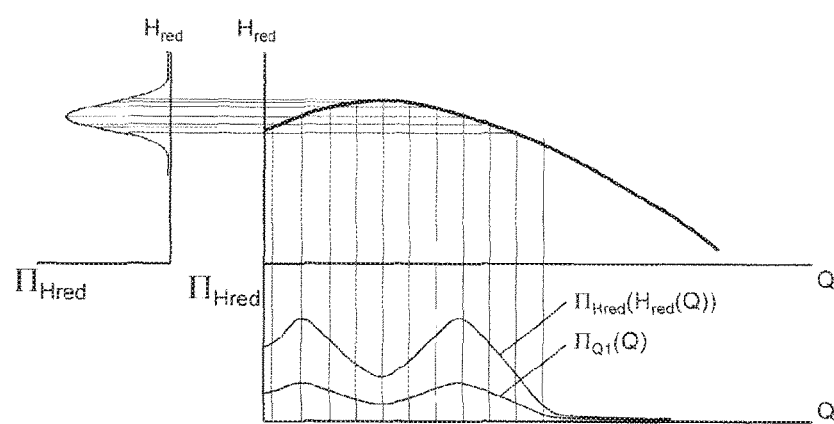
FIG. 2A shows a transfer of the probability density function for the delivery head in accordance with an embodiment of the present invention.

FIG. 2a shows three related diagrams. The upper left diagram depicts the probability density function $\Pi_{Hred}$ for the reduced delivery head. The probability density function $\Pi_{Hred}$ emerges from the following formula:

$$\Pi_{Hred} = \frac{1}{\sigma\sqrt{2\pi}}\exp\left(-\frac{1}{2}\left(\frac{H_{red} - H_{red.mess}}{\sigma}\right)^2\right)$$

Here the value for the reduced delivery head $H_{red.mess}$ ascertained from the measured pressures forms the expected value. The standard deviation $\sigma$, which describes the width of the probability density function, approximately corresponds to the expected measurement errors. In the exemplary embodiment, the expected measurement errors are +/−3% EOS.

In FIG. 2a, the top right diagram shows the characteristic $H_{red}(Q)$. Each delivery flow value Q is assigned a probability density $\Pi_{Hred}$ by way of the pump characteristic $H_{red}(Q)$. The result $\Pi_{Hred}(H_{red}(Q))$ is normalized (diagram bottom right, FIG. 2a). Hence, a first probability density function $\Pi_{Q1}(Q)$ arises, for which, as a result of the normalization, the following applies: $\int \Pi_{Q1}(Q)dQ=1$.

Figure 2B:
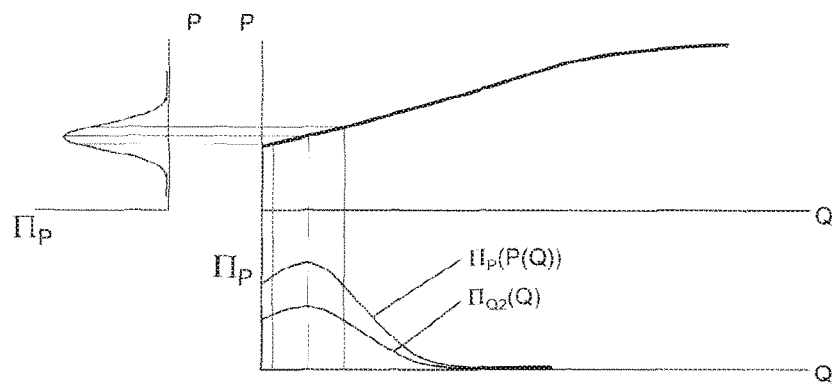
FIG. 2B shows a transfer of the probability density function for the power in accordance with an embodiment of the present invention.

Top left, FIG. 2b shows a probability density function $\Pi_p$ of the shaft power P. This function is calculated according to the following formula:

$$\Pi_P = \frac{1}{\sigma\sqrt{2\pi}}\exp\left(-\frac{1}{2}\left(\frac{P - P_{mess}}{\sigma}\right)^2\right)$$

Here, the current shaft power forms the expected value. The standard deviation $\sigma$, which describes the width of the probability density function, approximately corresponds to the expected measurement errors. In the exemplary embodiment, these are approximately +/−3% EOS.

The top right diagram in accordance with FIG. 2b plots the pump characteristic P(Q), in which the shaft power is represented depending on the delivery flow. Each discrete delivery flow value Q is assigned a probability density $\Pi_p$ by way of the pump characteristic P(Q). The result $\Pi_p(P(Q))$ is normalized (bottom right diagram, FIG. 2b). Hence, a second probability density function $\Pi_{Q2}(Q)$ arises, for which, as a result of the normalization, the following applies: $\int \Pi_{Q2}(Q)dQ=1$.

Figure 2C:
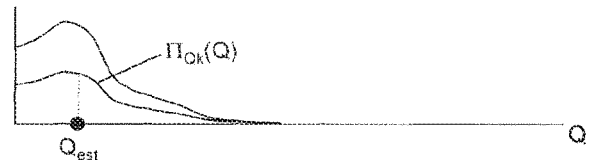
FIG. 2C shows a combination of the probability density functions for the delivery flows in accordance with an embodiment of the present invention.

FIG. 2c shows a diagram in which the product of the probability density functions $\Pi_{Q2}(Q)$ and $\Pi_{Q1}(Q)$ is plotted depending on the delivery flow. The upper curve shows the non-normalized values. The lower curve shows the normalized values. Said curve is the combined probability density function $\Pi_{Qk}(Q)$ of the delivery flow and is subsequently used for determining the delivery.

The delivery flow emerges as the expected value of the combined probability density function $\Pi_{Qk}(Q)$ of the delivery flow ($Q_{est}$ in FIG. 2c). Alternatively, the maximum value of the curve may also be used as delivery flow. The delivery flow as expected value is calculated according to the following equation:

$$E(X) = \int_{-\infty}^{\infty} xf(x)dx.$$

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for determining a current delivery flow of a motor-driven pump, comprising the acts of:
determining by at least one of measurement and calculation a value for a current delivery head being generated by the pump and a value for a current shaft power of the pump used to generate the delivery head,
calculating with an electronic evaluation unit a probability density function for the current delivery head and a probability density function for the current shaft power,
determining with the electronic evaluation unit a first probability density function for the current delivery flow from the probability density function for the current delivery head and a delivery head-delivery flow relationship of the pump,
determining with the electronic evaluation unit a second probability density function for the current delivery flow from the probability density function for the current shaft power and a power-delivery flow relationship of the pump,
determining with the electronic evaluation unit a combined probability density function for the current delivery flow from the first probability density function for the current delivery flow and the second probability density function for the current delivery flow, determining the current delivery flow from the combined probability density function, updating, using the current delivery flow from the combined probability density function, one or both of the delivery head-delivery flow relationship of the pump and the power-delivery flow relationship of the pump, and using the updated one or both of the delivery head-delivery flow relationship and the power-delivery flow relationship, and one or both of further measurement and further calculation of one or more of the current delivery head and the current shaft power of the pump, to one or both of control the pump to obtain a predetermined amount of delivery flow and determine an amount of actual delivery flow from the pump over a predetermined time interval.

2. The method as claimed in claim 1, wherein the probability density function for the current delivery head and the probability density function for the current shaft power is calculated by the electronic evaluation unit as a Gaussian function.

3. The method as claimed in claim 2, wherein the probability density function for the current delivery head and the probability density function for the current shaft power are normalized.

4. The method as claimed in claim 3, wherein the act of determining the combined probability density function for the current delivery flow includes multiplying the first probability density function for the current delivery flow by the second probability density function for the current delivery flow.

5. The method as claimed in claim 4, wherein in the act of determining the current delivery flow on the basis of the combined probability density function, the current delivery flow is determined as an expected value of the combined probability density function.

6. The method as claimed in claim 5, wherein in the act of determining the current delivery flow on the basis of the combined probability density function, the current delivery flow is ascertained as a maximum of the combined probability density distribution.

7. The method as claimed in claim 1, wherein an offset correction based on a value of a shaft power at a known delivery flow is applied to the power-delivery flow relationship.

8. The method as claimed in claim 1, wherein the value of the current delivery head is determined from a pressure difference between a pressure side and a suction side of the pump.

9. The method as claimed in claim 1, wherein the value of the current shaft power is determined from an actuation frequency of the motor and an effective pump power.

10. An arrangement for determining a current delivery flow of a motor-driven pump, comprising:

sensors for determining a pressure difference between a suction side and a pressure side of the pump;

at least one pump power determination unit configured to determine a mechanical power of the pump; and at least one evaluation unit configured to:
receive data from the sensors and the pump power determination unit,
store a delivery head-delivery flow relationship and a power-delivery flow relationship of the pump,
determine values for a current delivery head and a current shaft power from the received data and the stored relationships,
calculate a probability density function for the current delivery head and a probability density function for the current shaft power,
determine a first probability density function for the current delivery flow from the probability density function for the current delivery head and the stored delivery head-delivery flow relationship of the pump,
determine a second probability density function for the current delivery flow from the probability density function for the current shaft power and the stored power-delivery flow relationship of the pump,
determine a combined probability density function for the current delivery flow from the first probability density function for the current delivery flow and the second probability density function for the current delivery flow, and
determine the current delivery flow from the combined probability density function, and
update, using the current delivery flow from the combined probability density function, one or more of the delivery head-delivery flow relationship of the pump and the power-delivery flow relationship of the pump, and
one or both of control the pump to obtain a predetermined amount of delivery flow and determine an amount of actual delivery flow from the pump over a predetermined time interval, using the updated one or both of the delivery head-delivery flow relationship and the power-delivery flow relationship, and one or both of further measurement and further calculation of one or more of the current delivery head and the current shaft power of the pump.

11. The arrangement as claimed in claim 10, wherein at least one pump power determination unit includes a frequency converter configured to supply an actuation frequency and effective power to a motor of the pump.

12. The arrangement as claimed in claim 11, wherein the shaft power is determined from the actuation frequency of the motor and the effective power.

13. The arrangement as claimed in claim 10, wherein the current shaft power is determined from a shaft power measuring device.

14. The arrangement as claimed in claim 13, wherein the shaft power measuring device is a torque hub.

* * * * *